Feb. 25, 1964     D. J. TOMPOS     3,122,643
RADIOACTIVE SOURCE CAPSULE WITH CAPSULE
RETAINING AND RELEASING MEANS
Filed June 2, 1958     2 Sheets-Sheet 1

INVENTOR
Donald J. Tompos
by Anthony D. Cennamo

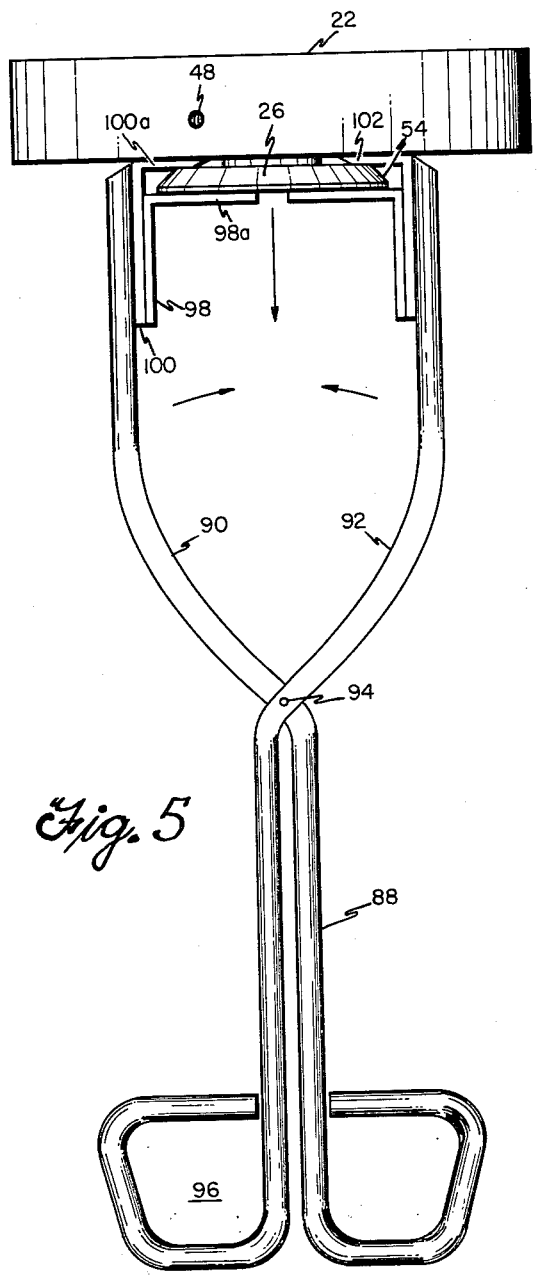

United States Patent Office 3,122,643
Patented Feb. 25, 1964

3,122,643
RADIOACTIVE SOURCE CAPSULE WITH CAPSULE RETAINING AND RELEASING MEANS
Donald J. Tompos, Worthington, Ohio, assignor to Industrial Nucleonics Corporation, a corporation of Ohio
Filed June 2, 1958, Ser. No. 739,037
12 Claims. (Cl. 250—106)

This invention relates to containers for radioactive sources and more particularly to an improved source capsule providing for the flexible mounting of a radioisotope within nuclear radiation gauges.

In modern process control systems, it is important that the finished product be carefully analyzed before control action is effected, and an integral element in each process control system is the detecting apparatus used to measure the finished product. In more recent years, nuclear radiation gauges have been accepted as the means for determining the variations in a particular physical property of a given material. These measuring gauges incorporate a source of radiant energy and a detector for said energy to provide an electrical signal indicative of thickness, density, composition or other physical property of a material placed within the radiation flux field of said source.

In nuclear radiation gauges, the source of radiant energy generally comprises a radioisotope which is contained in a metallic capsule. The source capsule is usually secured to a source holder mounted in the detecting unit of the gauge. Due to the comparatively short half-life of certain radioisotopes or for other reasons, it often becomes necessary to remove, insert and exchange source capsules from the source-detector assemblies of these gauges.

In experimental work on nuclear gauges, a number of different gauge prototypes are assembled every week which constantly involves the insertion and removal of various source capsules. Due to the extreme care which must be exercised by operating personnel when dealing with radioisotopes to avoid exceeding radiation tolerances, the procedure of source changing can be awkward and time-consuming. In addition, if it is desired to restore a source capsule to its original gauging head in a measuring device which has been previously calibrated, it is necessary that the capsule be geometrically repositioned exactly as before its removal in order to maintain accuracy of measurement.

In the past, source capsules have usually been fastened by screws to their holders. Securing a source capsule in this manner was generally a clumsy process involving the use of several long-handled tools, and mirrors. Operating personnel were further impeded by the presence of lead, plastic and other radiation shields. An alternative method was to provide a threaded capsule and a tapped recess in the source holder to accommodate the capsule. In this case, the actual source capsule was screwed into its holder. Either method of source mounting consumed a considerable period of time and exposed the operator to a substantial amount of radiation.

The present invention affords a novel snap-in type source capsule having a circumferential groove. Once inserted in a source holding block, this capsule is held securely by spring loaded detent pins carried in the holding block and serving to engage the groove about the capsule. Exertion is required to dislodge the capsule from its holder but a simple tong-like tool may be adapted to readily remove the source capsule.

Accordingly, it is a primary object of the present invention to provide a source capsule which may be more rapidly inserted in a suitable source-holder than devices used heretofore.

It is another object of the present invention to provide a novel type of source capsule which may be installed in various nuclear gauging apparatus without exposing servicing personnel to needless radiation.

It is also an object of the present invention to provide a source capsule the insertion of which in a source holder may be expedited by the use of a simple, inexpensive implement.

It is a further object of the present invention to provide a source capsule the removal of which from a source holder may be readily accomplished by employing the same implement as used for the insertion of said capsule.

It is still another object of the present invention to provide method and means for remotely removing and inserting a source capsule in a source holder.

It is an additional object of the present invention to provide a source capsule which is simple and inexpensive to manufacture.

Other objects and features of the present invention will be apparent from the following detailed description of a preferred embodiment taken in conjunction with the associated drawings in which:

FIG. 5 is a side elevation of a simple device for inserting or removing the source capsule from the source holder.

Figure 1:
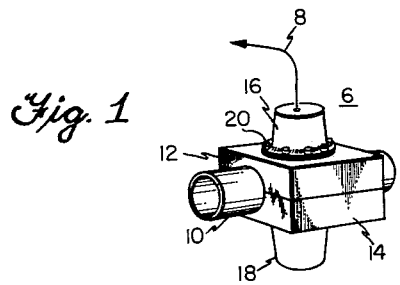
FIG. 1 is a perspective view of a source-detector unit of a nuclear gauge utilizing a source capsule for producing radiant energy.

Referring to the drawings and specifically to FIG. 1, therein is shown a preferred embodiment of the present invention comprising a source-detector unit 6 of a nuclear radiation gauge for determining fluid density. The source-detector unit 6 may be responsive to deliver a signal indicative of fluid density over a conductor 8 to an electrometer and suitable measuring and recording apparatus (not shown).

A conduit means 10 providing for the conveyance of liquidous material whose density is to be measured, is enveloped by an upper and a lower clamping block respectively designated as 12 and 14. The clamps 12 and 14 each having grooves milled therein to accommodate the conduit 10, may be preferably constructed of metal. Serving to enclose the radiation detector disposed within the upper clamp 12, is a bell-like housing 16. A similar housing 18 shields a radiation source mounted in the clamp 14. Housings 16 and 18 may be bolted at 20 to the clamping blocks 12 and 14 to provide access to the radiation source and detector.

Figure 2:
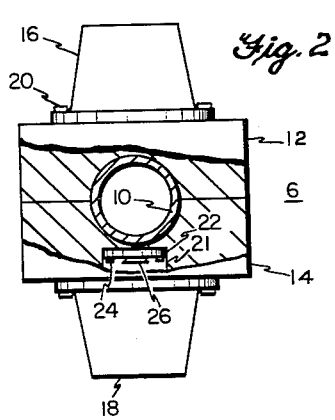
FIG. 2 is a partial sectional view of the unit of FIG. 1 showing the holder for the source capsule.

A typical mounting of the radiation source within the source-detector unit 6 is shown in FIG. 2. Referring now to FIG. 2, a recessed portion 21 is milled in clamp 14 and a source holder 22 is fixed therein by screws as at 24. A source capsule 26 containing a radioisotope is shown inserted in the holder 22 so that a flanged portion of the source capsule may be observed protruding somewhat above the generally flat surface of the holder 22.

Figure 3:
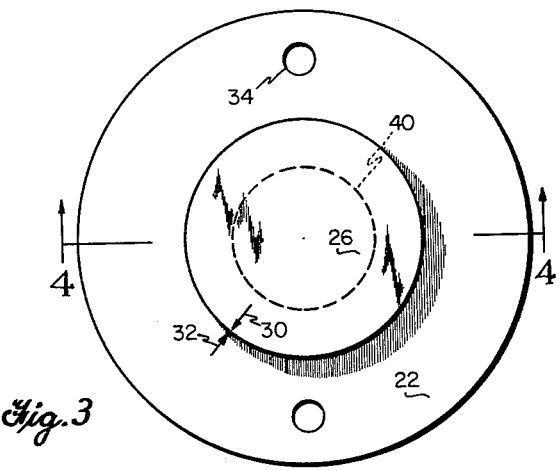
FIG. 3 is a top plan view of the source holder illustrated in FIG. 2 showing the source capsule placed therein in accordance with the present invention.

FIG. 3 shows the general configuration of the source holder 22 which may be a circular disk typically constructed of stainless steel. A recessed portion 40 is bored substantially in the center of the holder 22 to accept the capsule 26. Engraved on the exterior surface of the capsule 26 near its periphery is an indexing mark 30. In addition, a similar mark 30 is placed on the holder 22.

Holes may be drilled at 34 to receive the mounting screws 24.

Since most radioisotopes do not exhibit a uniform radiation field about their surface, the radial disposition of the capsule 26 within the holder 22 should remain constant so as not to alter the calibrated measuring characteristic of the gauging device. Should the capsule 26 be removed and later reinserted in the holder 22, the indices 30 and 32 are made to coincide so that the capsule 26 maintains its original radial position with respect to the holder 22.

Figure 4:
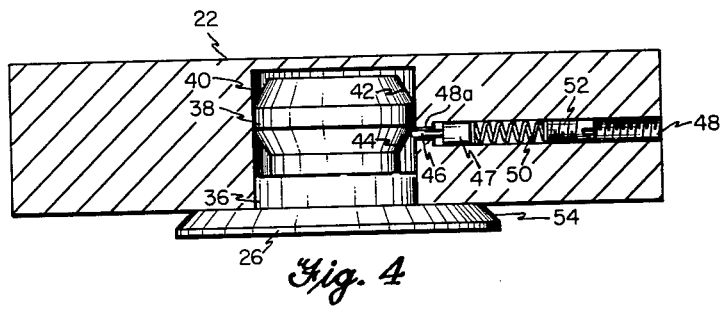
FIG. 4 is an enlarged sectional view on the line 4—4 of FIG. 3.

The manner in which the capsule 26 is removably restrained by the holder 22 may be more clearly understood by referring to FIG. 4 wherein the capsule 26 comprises a generally cylindrical plug of varying diameter likewise constructed of stainless steel. A primary locating shoulder 36 and a secondary locating shoulder 38 are milled to achieve substantially the same diameter as the inside diameter of the bored hole 40 in the source holder 22. It should be herein noted that only the primary locating shoulder 36 need bear a close tolerance with the mating diameter of the recessed cavity 40 to assure central situation of the capsule in the holder 22. Above the secondary locating shoulder 38, the capsule 26 gradually assumes an increasingly smaller diameter to provide a beveled camming surface 42. Similarly, between the locating shoulders 36 and 38, the diameter of capsule 26 is gradually reduced to afford a second camming surface 44.

A pair of detent pins 46 are angularly displaced about the central axis of the capsule 26 in communication with the camming surface 44. Each pin is carried in a hole 48 drilled parallel to the plane surface of the cylindrically shaped holder 22 toward the central axis thereof. These holes may be radially spaced approximately 120° apart to prevent rotation of the capsule 26 about the detent pins 46. The hole 48 further includes a counterbored portion 48a of substantially smaller diameter which terminates in the cavity 40. The hole 48 is partially tapped to provide a threaded portion for retaining a set screw 52. A spring 50 is disposed between the detent pin 46 and the set screw 52 and is adapted to urge the pin 46 forward toward the axis of the source capsule 26. Each pin 46 has a flanged portion 47 providing a surface against which the spring 50 may bear. The flange 47 also acts as a limiting device serving to check the forward motion of the pin 46. Communicating with the flat exterior surface of the holder is a securing flange of the capsule 26, the edge of which may be chamfered at 54 to provide a gripping surface for an instrument adapted for source removal.

In the operation of the preferred embodiment of the present invention, initially assuming that the capsule 26 is fully inserted in the holder 22 as illustrated, it will be apparent that its position therein will be maintained by the pressure of the detent pins 46 upon the camming surface 44. Forces acting upon the gauging device during its normal operation will usually be insufficient to dislodge the capsule 26 from its holder 22. However, if a moderate concentrated force is manually applied through the agency of a tool placed under the lip afforded by the chamfered flange 54, the pins 46 are forced to retract by the surface of the shoulder 38. Subsequent removal of the capsule 26 may be facilitated as the pins 46 help to eject the capsule 26 by exerting pressure on the camming surface 42 thereof. Once the capsule 26 is removed, the spring 50 urges the extension of the detent pins 46 into the cavity 40.

Conversely, if it be desired to replace the capsule 26 the camming surface 42 engages the detent pins 46 so as to cause the gradual recession of said pins into the opening 48a. As soon as the shoulder 38 has been inserted beyond the pins 46, the capsule 26 is rigidly secured by the pressure exerted upon the camming surface 44. Accordingly, the primary locating shoulder 36 should then assure proper seating of the capsule 26 within the holder 22. The source capsule 26 may be conveniently rotated to establish the original radial orientation of the source material by aligning the index markings in a manner described hereinabove.

A device for extracting the capsule 26 may take the form shown in FIG. 5. Tool 88 is shaped into a tong-like device operable to grasp the source capsule 26 for purposes of removing the same from the holder 22. The tool 88 may include a pair of curved tubular arms 90 and 92 of stainless steel pivotally connected at 94. One end of each arm is formed to establish a handle as at 96. The alternate end of each arm terminates in a clamping element including a lower L-shaped angle bracket 98 and a similarly constructed upper L-shaped angle bracket 100. It should be noted that the length of one upstanding leg 100a of bracket 100 is made substantially equal to one-half the length of one leg 98a of the bracket 98. In addition, the leg 100a may preferably terminate in a beveled portion 102 to provide a bearing surface for the capsule 26. The adjacent legs 98a and 100a are spaced a distance approximately equal to the thickness of the flange 54 of the source capsule 26. The brackets 98 and 100 may be secured by spot welds to the arms 90 and 92.

In removing the capsule 26, the operator places the legs 98a and 100a of both arms 90 and 92 about the flange 54 so as to contact the capsule 26 at diametrically opposite sides thereof. If manual pressure is applied to force the handles 96 together, the arms 90 and 92 are urged toward each other in the direction indicated by the arrows. The leg 100a engages the underside of the flange 54 so as to pry the capsule 26 from the holder 22. A pulling motion indicated by the single arrow may then be imparted to the tool 88 by the operator to displace the capsule 26 from the holder 22. Conversely, the tool 88 may likewise be utilized for inserting the source capsule 26 within the holder 22. However, a detailed description of this function is herein omitted since it will be apparent to those skilled in the art.

Figure 6:
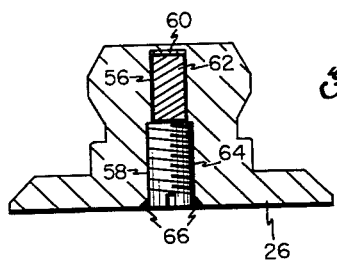
FIG. 6 is a sectional view of the source capsule of FIG. 4 illustrating the mounting of the radioactive substance therein.

One method of incorporating a radioactive substance within the source capsule 26 is hereinafter described with reference to the detailed sectional view of FIG. 6. A hole 56 having a tapped counterbored portion 58 may be drilled substantially in the center of the source capsule 26. The radioactive substance 60 which may comprise a gold foil to which a compound of the radioisotope has been bound by rolling, is disposed in the bottom of the hole 56; a cylindrical spacer 62 is secured against the capsule 26 by a sealing set screw 64 having threads engaging the tapped opening 58 in the source capsule 26. If desired, the sealing plug 64 may be silver soldered at 66 to afford ample protection against adulteration of the source material 60. Also it may be advantageous to fabricate the spacer 62 and set screw 64 of non-corrosive metal.

Although the preceding disclosure describes a particular embodiment of the present invention, it should be understood that it is merely exemplary and that numerous variations of the embodiment may be employed without detracting from the original spirit and scope of the invention.

What is claimed is:

1. A radiation device comprising a radioactive source, a capsule for enclosing said source consisting of a base member and an elongated member with an annular groove therein; a holder with a centrally positioned cavity of a diameter less than said base member and substantially the same inside diameter as the outside diameter of said elongated member and adapted to receive the same, and restraining means mounted within said holder and extending into said cavity, said restraining means positioned in said annular groove to yieldably secure said capsule when said elongated member is inserted in said holder.

2. A radiation device substantially as set forth in claim 1 wherein said restraining means comprises at least two spring-loaded detent mechanisms.

3. A radiation device substantially as set forth in claim 1 wherein said restraining means comprises at least two spring-loaded detent pins mounted unsymmetrically about the central axis of said cavity.

4. A radiation device comprising a radioactive source, a capsule having means for enclosing said radioactive source therein, consisting of a base member and an elongated member, said elongated member having a primary locating shoulder of lesser dimension than said base member and adjoined thereto, a secondary locating shoulder of essentially the same diameter as said primary locating shoulder, a first tapered portion joining said primary and said secondary shoulders, a second tapered portion connected to said secondary shoulder and extending the remaining length of said elongated member; a holder, a cavity positioned substantially in the center of said holder having an inside dimension substantially equivalent to the outer dimension of said locating shoulders and adapted to receive same, and restraining means mounted within said holder and extending into said cavity, said first tapered portion engaging said restraining means to yieldably secure said capsule when said elongated member is inserted in said holder.

5. A radiation device substantially as set forth in claim 4 wherein said restraining means comprises at least two spring-loaded detent mechanisms.

6. A radiation device substantially as set forth in claim 4 wherein said restraining means comprises at least a pair of spring-loaded detent mechanisms mounted unsymmetrically about the central axis of said cavity.

7. A radiation device substantially as set forth in claim 4 wherein said capsule enclosing means comprises a partially tapped cylindrical hole substantially in the center of said base member and adapted to receive said radioactive source, a sealing screw engaging the threaded walls of said hole, and a spacing plug placed within said hole between said sealing screw and said radioactive source to maintain the same within said hole.

8. A radiation device substantially as set forth in claim 4 wherein said base member comprises a flange terminating in a generally flat external surface having an undercut portion about its periphery extending toward said primary locating shoulder to facilitate the removal or insertion of said capsule in said holder.

9. A radiation device substantially as set forth in claim 4 wherein said base member comprises a flange terminating in a generally flat external surface having an undercut portion about its periphery extending toward said primary locating shoulder, and tool means for wedgingly engaging said flange to facilitate the removal or insertion of said capsule in said holder.

10. A radiation device substantially as set forth in claim 4 wherein said base member comprises a flange terminating in a generally flat external surface having an undercut portion about its periphery extending toward said primary locating shoulder, and tong-like means having a pair of jaws to wedgingly engage said flange to facilitate the removal or insertion of said capsule in said holder.

11. A radiation device substantially as set forth in claim 4 wherein said base member comprises a flange terminating in a generally flat external surface having an undercut portion about its periphery extending toward said primary locating shoulder, and tong-like means comprising a pair of pivoted arms each having a manually operative handle on an end, a pair of jaws on the other ends of said arms, each of said jaws including a first upstanding member and a second upstanding member, said second upstanding member mounted between said first upstanding member and said pivot, said first and second upstanding members being bent inwardly substantially perpendicular to the main body of each of said arms and spatially separated to accommodate said flange of said capsule therebetween; operator means connected to said handles, said jaw means responsive to said operator means to wedgingly engage said flange at opposite sides thereof to facilitate the removal or insertion of said capsule in said holder.

12. A radiation device substantially as set forth in claim 11 wherein each of said first upstanding members is substantially shorter than said second upstanding member.

References Cited in the file of this patent

UNITED STATES PATENTS

| | | |
|---|---|---|
| 2,164,203 | Douglas | June 27, 1939 |
| 2,194,824 | Douglas | Mar. 26, 1940 |
| 2,571,302 | Smith | Oct. 16, 1951 |
| 2,843,753 | Meeder | July 15, 1958 |